(12) United States Patent
Pfeifer et al.

(10) Patent No.: US 11,679,793 B2
(45) Date of Patent: Jun. 20, 2023

(54) METHOD FOR OPERATING A CABLEWAY

(71) Applicant: Innova Patent GmbH, Wolfurt (AT)

(72) Inventors: Daniel Pfeifer, Sankt Anton am Arlberg (AT); Alexander Berdnik, Dornbirn (AT); Stefan Gisinger, Wolfurt (AT); Markus Fehle, Wolfurt (AT)

(73) Assignee: Innova Patent GmbH, Wolfort (AT)

( * ) Notice: Subject to any disclaimer, the term of this patent is extended or adjusted under 35 U.S.C. 154(b) by 563 days.

(21) Appl. No.: 16/622,085

(22) PCT Filed: Jun. 11, 2018

(86) PCT No.: PCT/EP2018/065286
§ 371 (c)(1),
(2) Date: Dec. 12, 2019

(87) PCT Pub. No.: WO2018/228971
PCT Pub. Date: Dec. 20, 2018

(65) Prior Publication Data
US 2021/0024110 A1 Jan. 28, 2021

(30) Foreign Application Priority Data
Jun. 13, 2017 (AT) .............................. A 50495/2017

(51) Int. Cl.
*B61L 27/57* (2022.01)
*B61B 7/04* (2006.01)
(Continued)

(52) U.S. Cl.
CPC ................ *B61L 27/57* (2022.01); *B61B 7/04* (2013.01); *B61B 12/002* (2013.01); *B61B 12/06* (2013.01); *B61L 25/04* (2013.01); *G01P 3/64* (2013.01)

(58) Field of Classification Search
CPC .......... B61L 25/02; B61L 25/04; B61L 27/57; B61B 7/00; B61B 7/04; B61B 12/002; B61B 12/06; B61B 12/122; G01P 3/64
See application file for complete search history.

(56) References Cited

U.S. PATENT DOCUMENTS 5,363,316 A    11/1994   Spencer
7,764,169 B2 *   7/2010   Rowell .................... H04L 69/40
                                                                  340/508
(Continued)

FOREIGN PATENT DOCUMENTS

CN       104442836 A *   3/2015   ............... B61B 7/00
EP        2067682 A1 *   6/2009   .......... B61B 12/002
(Continued)

OTHER PUBLICATIONS

Korean Office Action; Application No. 10-2020-7000687; dated Jan. 29, 2021; 3 Pages.
(Continued)

*Primary Examiner* — S. Joseph Morano
*Assistant Examiner* — Cheng Lin
(74) *Attorney, Agent, or Firm* — Husch Blackwell LLP

(57) ABSTRACT

In order to simplify the troubleshooting in a cableway during operation of the cableway, a unique car identification is assigned to each car, with the car identification of each car being known by the cableway control system. At least one function monitoring unit transmits malfunctions triggered by cars during the operation of the cableway to the cableway control system in a function status message FSi. The cableway control system assigns a malfunction that was received to the triggering car and the malfunctions together with the car identification of the triggering car are stored and evaluated in the cableway control system.

19 Claims, 4 Drawing Sheets

(51) Int. Cl.
  *B61B 12/00* (2006.01)
  *B61B 12/06* (2006.01)
  *B61L 25/04* (2006.01)
  *G01P 3/64* (2006.01)

(56) References Cited

U.S. PATENT DOCUMENTS

| | | | |
|---|---|---|---|
| 8,166,886 | B2 | 5/2012 | Thum |
| 8,710,977 | B2 * | 4/2014 | Gubler .................... B61B 12/06 |
| | | | 340/542 |
| 10,213,700 | B2 * | 2/2019 | Cylvick ................ F16D 63/008 |

FOREIGN PATENT DOCUMENTS

| | | | | |
|---|---|---|---|---|
| EP | 2067682 | A1 | 6/2009 | |
| FR | 2750764 | A1 | 1/1998 | |
| FR | 2807988 | A1 * | 10/2001 | ............. B61B 12/06 |
| JP | 2001069162 | A * | 3/2001 | ........... B61B 12/002 |
| JP | 2001069162 | A | 3/2001 | |
| JP | 2005335488 | A * | 12/2005 | |
| JP | 2005335488 | A | 12/2005 | |
| JP | 2007326442 | A | 12/2007 | |
| KR | 1020150103821 | A | 9/2015 | |
| RU | 2493989 | C2 | 9/2013 | |
| WO | WO-2015196221 | A1 * | 12/2015 | ............. B61B 12/00 |

OTHER PUBLICATIONS

Russian Office Action Application No. 2019144082 dated Jun. 25, 2020 4 pages.
Austrian Office Action Application No. A 50495/2017 Completed: May 16, 2018; dated Jun. 19, 2018 3 Pages.
International Preliminary Report on Patentability Application No. PCT/EP2018/065286 Completed: Oct. 9, 2019 11 Pages.
International Search Report and Written Opinion of the International Searching Authority Application No. PCT/EP2018/065286 Completed: Sep. 11, 2018; dated Sep. 21, 2018 12 Pages.
Translation of the International Search Report and Written Opinion Application No. PCT/EP2018/065286 Completed: Sep. 11, 2018; dated Sep. 21, 2018 3 Pages.

* cited by examiner

METHOD FOR OPERATING A CABLEWAY

TECHNICAL FIELD

A method for operating a cableway, wherein the cableway is controlled by a cableway control system to move a plurality of cars between a first station and a second station and wherein at least one function monitoring unit monitors a function of the cableway associated with a car.

BACKGROUND

A cableway, whether for carrying persons or objects, usually has a plurality of function monitoring units in order to ensure the correct functioning of the cableway. It does not matter which type of cableway it is. It may be an aerial cableway, for example in the form of a gondola lift, a chair lift or an aerial tramway in which the cars are transported hanging on a support or conveying cable, or a rail cableway, such as a funicular in which the cars are moved on a stationary track. The cars are pulled by a rope of the cableway in all of the different types.

Depending on which function is monitored with a function monitoring unit, the cableway control system triggers a specific action in the event a malfunction is detected. This may, for example, be a warning or error message for the operating personnel but may also be a shutdown of the cableway if safety is at risk. Often, the operating personnel must acknowledge the malfunction in the cableway control system in order to put the cableway back into operation. In addition, it may be necessary for the operating personnel to manually correct a faulty condition before operation can be resumed. Depending on which function is monitored with a function monitoring unit, the function monitoring unit may be arranged at a specific point of the cableway, in particular not only in a station of the cableway but also on the track, for example on a lift pylon in the case of an aerial cableway.

Troubleshooting a cableway may be very expensive due to the complexity of a cableway. Even if the operation of the cableway after an error is possible, certain errors may occur constantly or frequently, which of course requires an equally frequent intervention of the operating personnel.

It is known from JP2005/335488 A1 to store the values of a spring force measurement of a clamping spring of a clamp of a detachable car of a cableway together with a unique car identification in a database. This allows for the subsequent analysis of the stored data records to detect a gradual change in the spring force.

Of course, a cableway has to be maintained regularly as well. U.S. Pat. No. 5,363,316 A proposes to uniquely identify each car to determine the operating time for each car. Thus, maintenance, in particular maintenance of the cars, can be planned in a targeted manner. This does not, however, solve the monitoring of a specific function or the troubleshooting issue.

SUMMARY

It is therefore an object of the present teaching to provide a method with which troubleshooting in a cableway during operation of the cableway is simplified.

This object is achieved by assigning each car a unique car identification with the car identification of each car being known in the cableway control system, wherein the at least one function monitoring unit transmits malfunctions triggered by cars during the operation of the cableway to the cableway control system in a function status message, wherein the cableway control system assigns a received malfunction to the triggering car and wherein the malfunctions are stored together with the car identification of the triggering car in the cableway control system and evaluated. Storing the malfunctions together with a unique car identification makes the troubleshooting in the cableway easier because it provides an indication of a possible error location and a triggering car. Especially in cableways with many cars, this may significantly simplify the troubleshooting.

If the frequency of the malfunction of a particular function monitoring unit triggered by the same car is analyzed in the cableway control system, it can be easily determined whether certain cars are responsible for the malfunction, which can then be specifically checked or removed.

If the frequency of malfunctions of a particular function monitoring unit triggered by different cars is analyzed in a cableway control system, it can be easily determined whether and where there could be a technical problem or defect in the cableway, which can then be specifically checked and corrected.

The troubleshooting can be improved if at least one car parameter of the cars is detected with the function monitoring unit and if the detected car parameters of the cars are transmitted to the cableway control system with a function status message, where the car parameters are assigned to the triggering car and stored together with the car identification of the triggering car and evaluated.

If a trend of a car parameter obtained by a particular function monitoring unit of a particular car over time is evaluated in the cableway control system, then a creeping defect of the car can easily be detected, and the car can then be specifically checked or removed, or maintenance of the car can be planned in a better manner.

If car parameters of a particular function monitoring unit and from different cars are evaluated in the cableway control system, it is easy to determine if and where there could be a technical problem or defect in the cableway, which can then be specifically checked and corrected.

In order to be able to react flexibly to a malfunction, the cableway control system may trigger an action depending on a malfunction message that has been received. The actions may preferably be configured in the cableway control system.

In order to make the cableway control system aware of the car identifications of the cars, the car identifications may be detected while the cableway is loaded with the cars, with the detected car identifications being transmitted to the cableway control system. Thus, the cableway control system can easily obtain knowledge of the car identifications before the cableway is started. Alternatively or additionally, however, at least one function monitoring unit may detect a car identification of a car and transmits it to the cableway control system, preferably together with a malfunction and/or a car parameter in a function status message. Thus, the cableway control system may also receive car identifications during operation and use it, for example, to verify the stored car identifications.

In an advantageous embodiment, a spring force of a clamp of a car is detected by a function monitoring unit, and the detected spring force is transmitted in the function status message to the cableway control system as a car parameter. In this embodiment, the function monitoring unit may transmit a function status message about a malfunction to the cableway control system when the detected spring force falls below a predetermined limit.

In a further advantageous embodiment, a passage of a car through a defined passage zone in the station or between the two stations is monitored with a function monitoring unit, and the time of passage or a traveled cable distance for the passage through the passage zone is detected and transmitted as a car parameter in the function status message to the cableway control system. The function monitoring unit may transmit a function status message about a malfunction to the cableway control system when the car is moved too slowly or too fast through the passage zone with respect to a predetermined time window or a predetermined cable distance range.

In a further advantageous embodiment, a door or restraining bar lock of a car is monitored by a function monitoring unit, and a function status message about the malfunction is transmitted to the cableway control system when a faulty door or restraining bar lock is detected.

In a further advantageous embodiment, a seat heater of a seat of a car is monitored by a function monitoring unit, and the power consumption of the seat heater is transmitted to the cableway control system in the function status message as a car parameter. The function monitoring unit may transmit a function status message about a malfunction to the cableway control system when the detected power consumption falls below or exceeds a predetermined limit.

In a further advantageous embodiment, a barrier is monitored by a function monitoring unit, and a function status message about the malfunction is transmitted to the cableway control system when a car triggers the barrier.

BRIEF DESCRIPTION OF THE DRAWINGS

The present teaching is described in greater detail below with reference to the FIGS. 1 through 4, which show exemplary, schematic and non-limiting advantageous embodiments of the present teaching. In the drawings.

DETAILED DESCRIPTION

Figure 1:
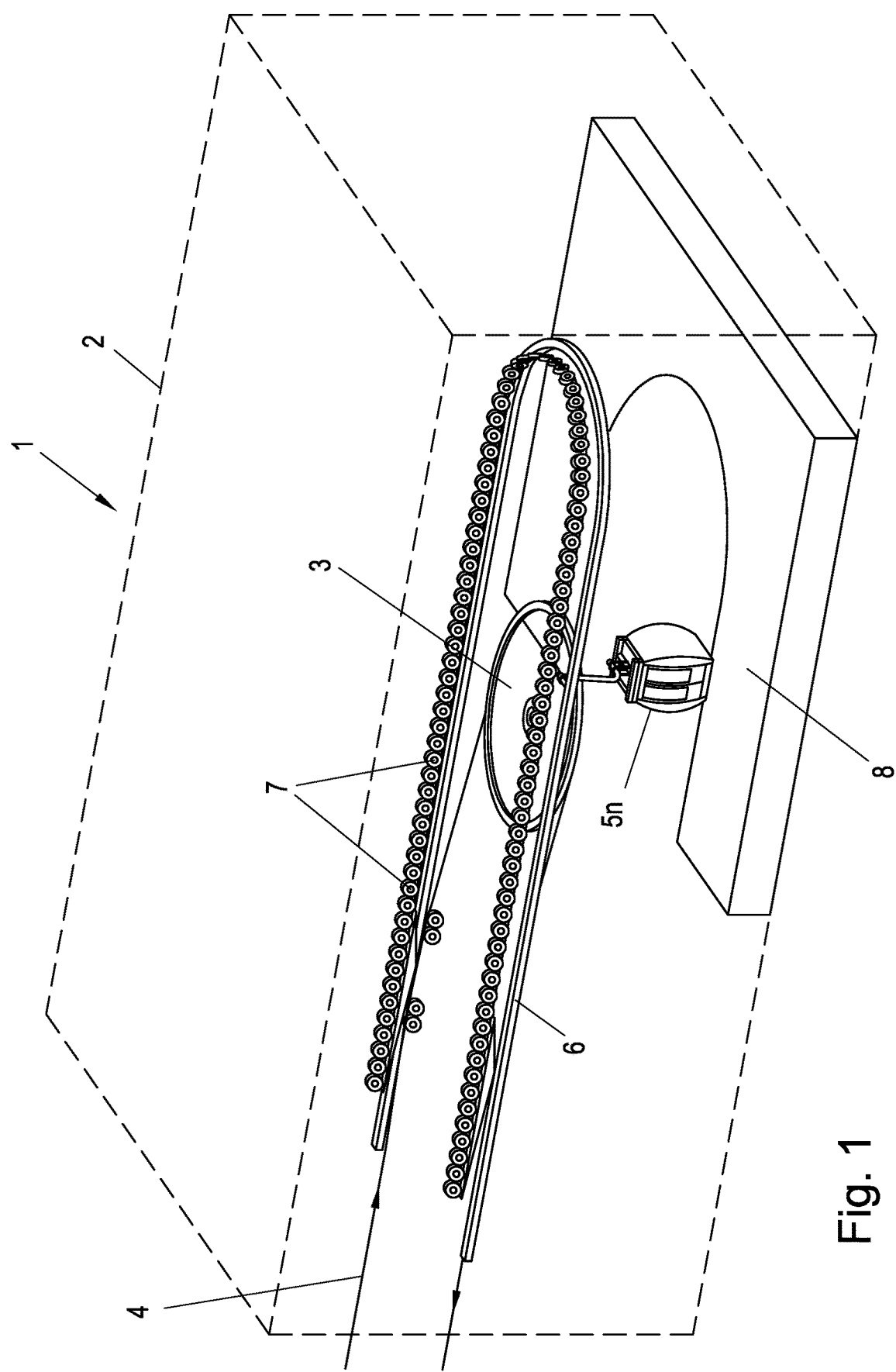
FIG. 1 shows a station of a cableway.

The present teaching will be described below, without limiting the generality, by using the example of a gondola lift as an embodiment of a well-known cableway 1, as shown in FIG. 1. FIG. 1 shows a station 2 (indicated by dashed lines) of the cableway 1. In the station 2, a cable pulley 3 is arranged, via which a conveying cable 4 of the cableway 1 is deflected. A cable pulley 3 in one of the stations of the cableway 1 is driven in a known manner by a drive to circulate the conveying cable 4 in a loop over a cable pulley of another station. It is also known that the conveying cable 4 is tensioned by a tensioning device acting on the cable pulley 3. For reasons of clarity, these known devices, in particular the second station with a cable pulley, a drive, a tensioning device, etc., are not shown. A cableway 1 can move a large number of cars $5n$, $n \geq 1$ simultaneously, typically in the range of a few tens or a few hundreds of cars $5n$, but for the sake of simplicity, only one car is shown.

If the cableway 1 is not equipped with cars $5n$ that are permanently clamped to the conveying cable 4, a car $5n$ entering the station 2 of the cableway 1 is decoupled from the conveying cable 4, generally by means of a releasable clamp 16 (FIG. 2) and moved through the station 2 along a guide rail 6, usually at a much lower speed than on the route between the two stations. A conveyor is provided along the guide rail 6, for example in the form of a plurality of driven conveyor wheels 7, with which the car $5n$ is moved. When the car $5n$ is moved out of the station 2, the car $5n$ is accelerated when exiting via the conveyor and coupled again to the conveying cable 4, for example by means of a clamp 16.

A platform 8 is often provided in the station 2 on which people can get in or off of the cars $5n$.

Figure 2:
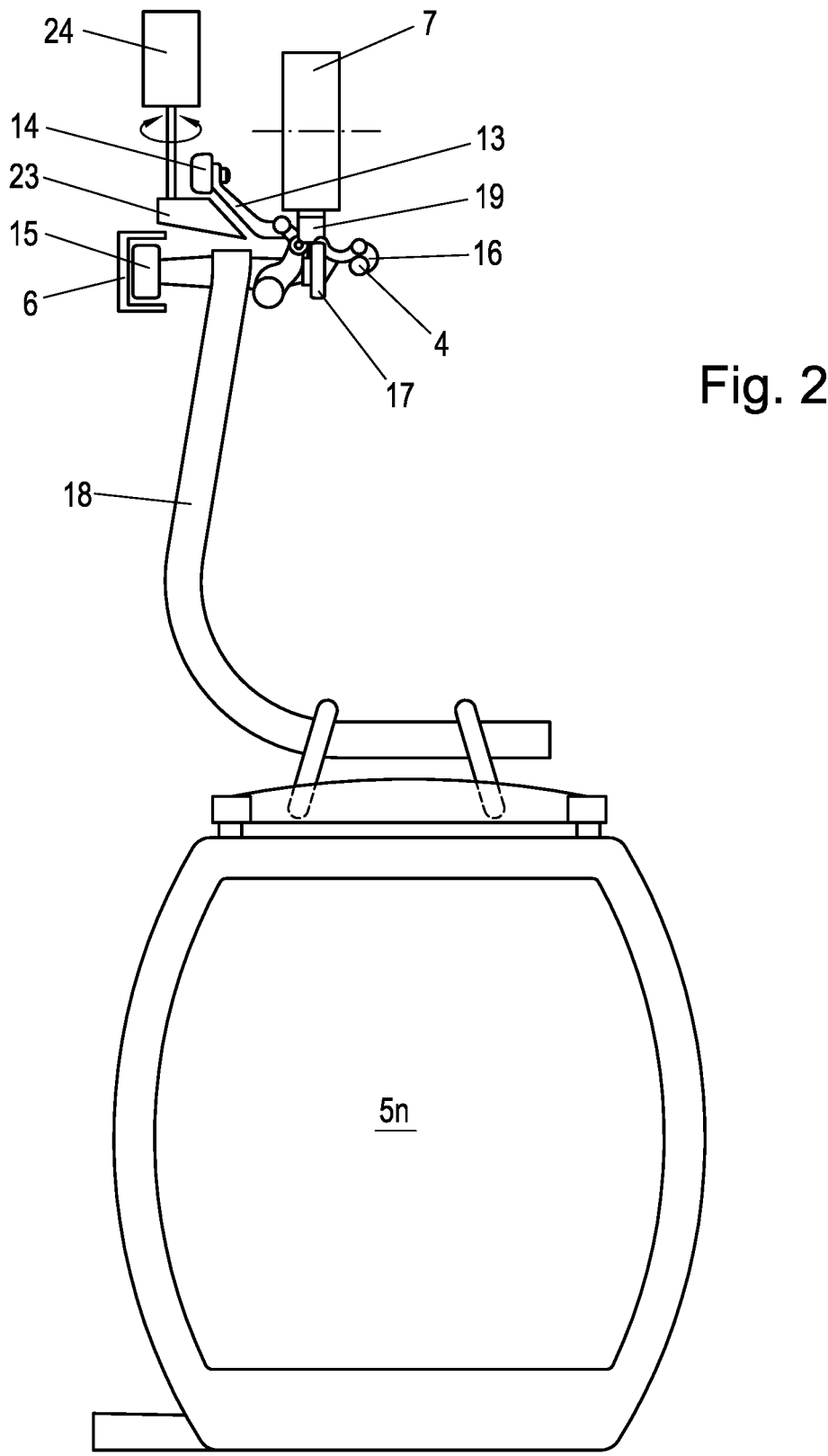
FIG. 2 shows a car of a cableway.

FIG. 2 shows a car $5n$, here a cabin, of the cableway 1 that is detachable from the conveying cable 4. By means of a hanger 18, the car $5n$ is connected to a carriage 17, which in the simplest case consists of only one running wheel. On the suspension 18, a clamp 16 is arranged, which can clamp the conveying cable 4 under the effect of a clamping spring and which can be mechanically actuated via a coupling roller 14 and a clamp lever 13. When the coupling roller 14 rolls on guide ramps in the station 2, the clamp lever 13 is actuated, and the clamp 16 is opened. The clamp 16 closes by the effect of the clamping spring. A guide roller 15 is arranged on the hanger 18 as well, which interacts in the station 2 with the guide rail 6. A friction lining 19 is arranged as well, which can interact with the conveyor, for example the rotating conveyor wheels 7, in order to move the decoupled car $5n$ through the station 2 along the guide rail 6.

Figure 3:
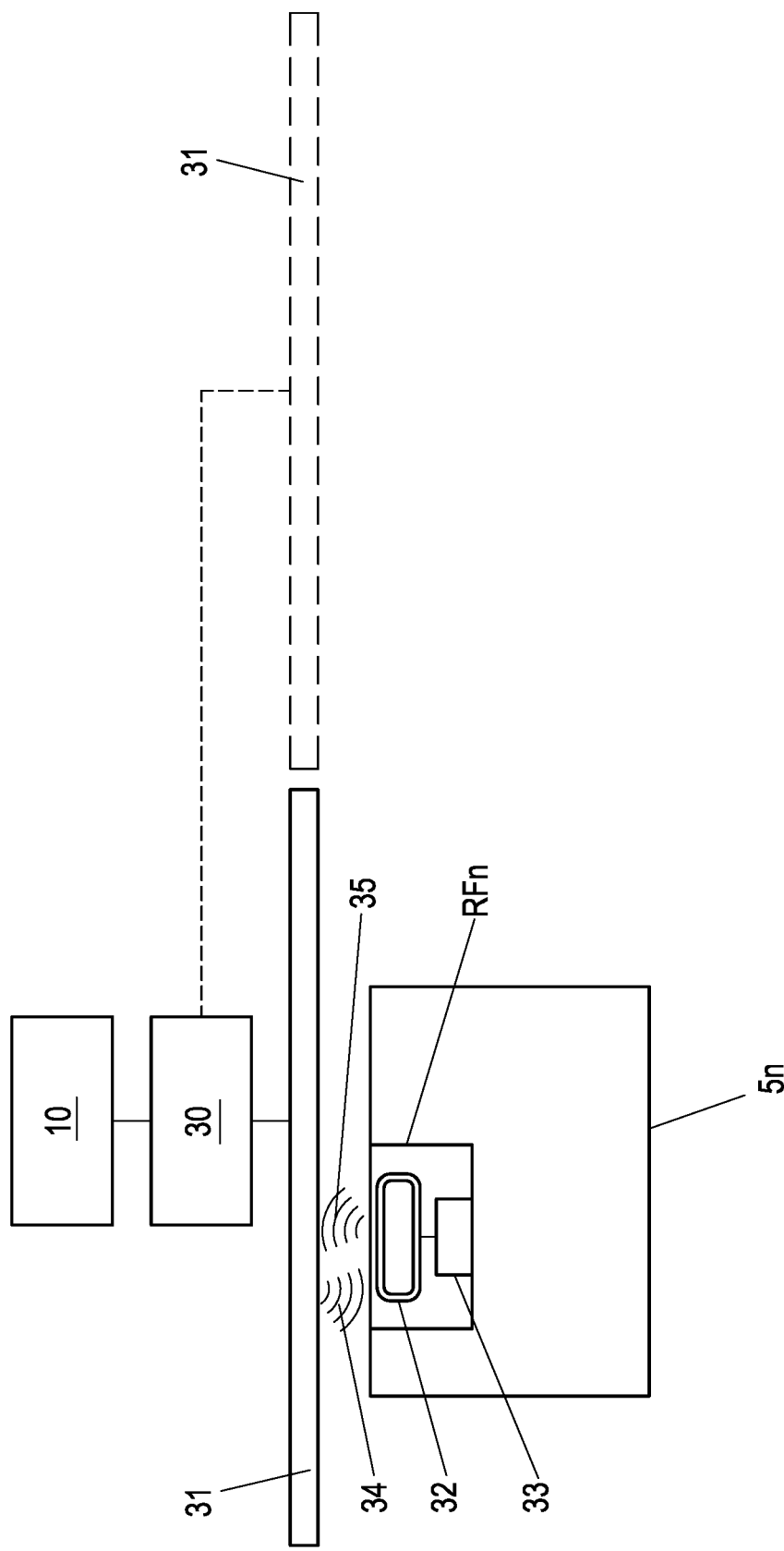
FIG. 3 shows the use of a radio transponder for reading a car identification.
Figure 4:
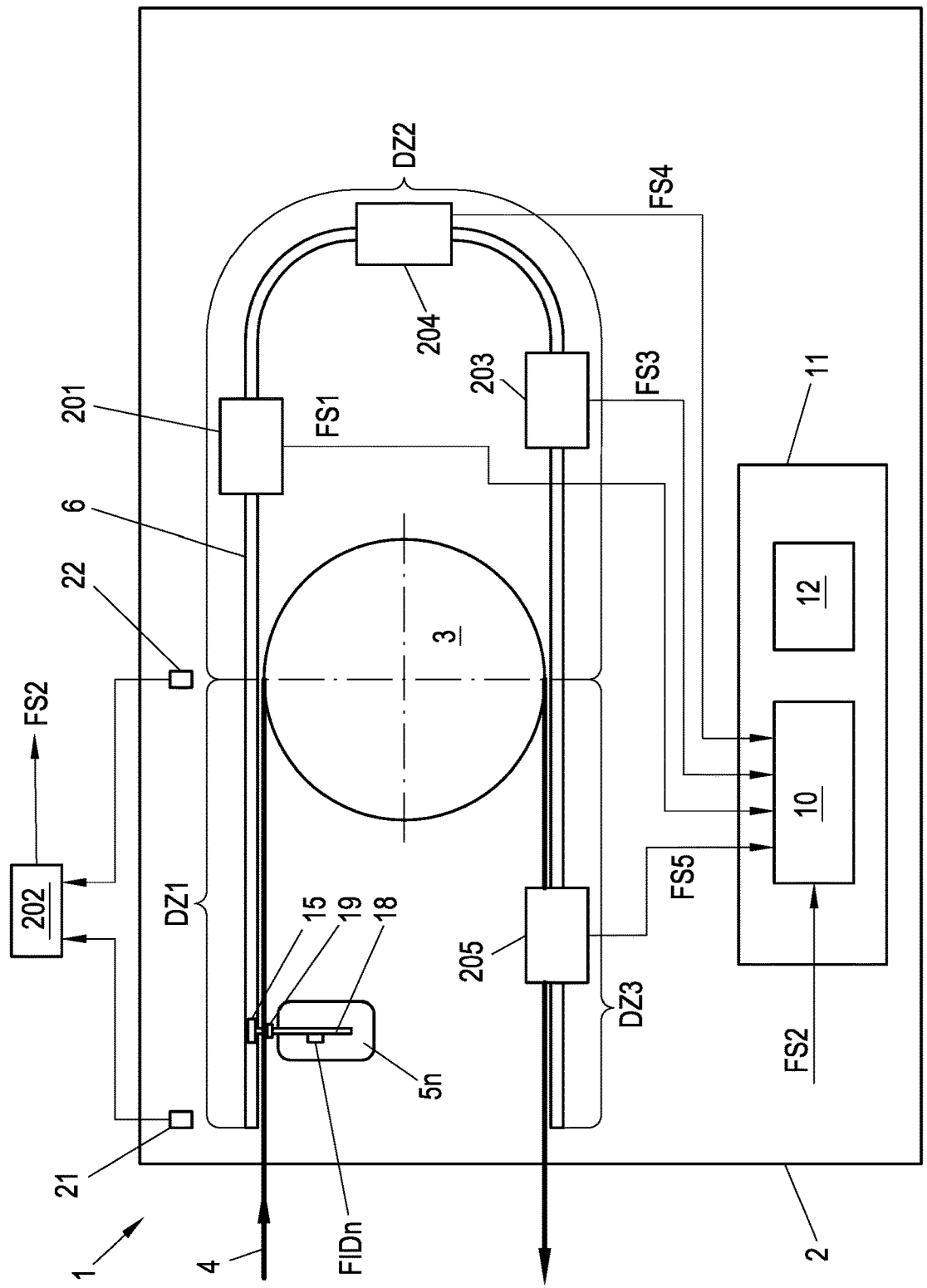
FIG. 4 shows different function monitoring units in a station of a cableway.

The cableway 1 is controlled by a cableway control system 10, in the form of suitable hardware and software, as indicated in FIG. 3 and FIG. 4. The cableway control system 10 is generally distributed over a plurality of control units, for example programmable logic control systems (PLCs) and central computer, which are connected to one another and together provide the control system of the cableway 1. The control units may be assigned to certain parts or subassemblies of the cableway 1. A cableway 1 normally also comprises a command room 11 (FIG. 4) from which all functions of the cableway 1 can be monitored and controlled via the cableway control system 10. For this purpose, of course, the command room 11 and/or the station 2 feature the corresponding input and display units 12, such as keys, buttons, keyboard, screens, lights, etc.

The setup and operation of a cableway 1 and its components is well known so that it is discussed here only insofar as this is necessary for the understanding of the present teaching.

A cableway 1 also comprises a plurality of function monitoring units $20i$, which monitor a specific function of the cableway 1 linked to a car $5n$. Currently, the function monitoring units $20i$ transmit malfunctions, in the form of a deviation of the function from an expected normal function, to the cableway control system 10, which triggers certain actions associated with a malfunction. An action may be, for example, the display of a warning message on the input and display units 12, the issuance of an error message that automatically leads to an emergency stop, the stopping of the cableway 1, the removal of a car $5n$, or an action to be performed by the operating personnel (for example, a check of the function monitoring unit, deactivation of the unit, reversing, rechecking, removing a car, switch to the emergency drive, etc.). During the operation of the cableway 1, the large number of cars $5n$ may lead to frequent malfunctions, which sometimes makes troubleshooting difficult since a fault or a fault location cannot be reliably identified on the basis of the malfunction alone. One object of the present teaching is to improve this situation.

Consequently, according to the present teaching each of the $n \geq 1$ cars $5n$ is provided with a unique car identification FIDn. The car identification FIDn can be read with a reader. The car identification FIDn can basically be of any type, as can the implementation of the reader for reading the car identification FIDn. For example, a barcode, QR code or the like may be optically read, for example with a laser, with image acquisition and evaluation or with infrared. The use of ultrasound or microwave with suitable car identifications FIDn is conceivable as well.

However, the use of radio transceivers RFn such as RFID (Radio Frequency Identification) transponders (often also called RFID tags) for storing the car identification FIDn is particularly advantageous, as explained with reference to FIG. 3. Especially passive radio transponders RFn, e.g. passive RFID transponders, are a good option here because no power supply for the radio transponders RFn on the car 5n is necessary for this purpose. A passive radio transponder is active only in the effective range of a transmitting antenna 31 of a reader 30 spanning an electromagnetic field since the passive radio transponder RFn obtains its operating power from the electromagnetic signal emitted by the transmitting antenna 31, which is received with a receiving antenna 32 in the radio transponder RFn. A unique car identification FIDn can be stored in a non-volatile storage unit 33 of the radio transponder RFn which can be read and transmitted to the reader 30. The reader 30 may also write to the storage unit 33 in certain embodiments, for example to store a unique car identification FIDn in the storage unit 33. Such a radio transponder RFn may be very small and may therefore be used very flexibly. In the effective range of the transmission antenna 31, which transmits an interrogation signal 34, the radio transponder RFn responds with a response signal 35 containing the car identification FIDn. The response signal 35 is received by the transmission antenna 31 and forwarded to the reader 30, which decodes the car identification FIDn from the response signal 35. The reader 30 is connected to the cableway control system 10 and can send the car identification FIDn to the cableway control system 10. A plurality of transmitting antennas 31 may be connected to a reader 30 as well, as indicated in FIG. 3.

Depending on the speed of the passing car 5n, typically in the range of 0.3 m/s to 7 m/s in a cableway 1, the transmitting antenna 31 may be of different lengths (viewed in the direction of travel of the car). The transmitting antenna 31 is preferably flexible as well in order to be able to arrange the transmitting antenna 31 at different points of the cableway 1 or a station 2.

Of course, the transmitting antenna 31 and the radio transponder RFn are to be arranged so that the radio transponder RFn can reach the effective range of the transmitting antenna 31. The radio transponder RFn could, for example, be arranged on the hanger 18 or on the carriage 17 of the car 5n, and the transmitting antenna 31 could be arranged on the guide rail 16 in the station 2. Of course, there are many more possibilities.

In normal operation, the cableway control system 10 is aware of the location of the cars 5n at any time. This is always easy to do due to the speed of the conveying cable 4, which is always known, the length of the conveying cable and optionally also the speed of the uncoupled cars 5n in the station. By using unique car identifications FIDn, the cableway control system 10 now not only knows where a car 5n is located, but also which car 5n is where. For this purpose, the car identification FIDn of each car 5n can be read in at least one arbitrary place of the cableway 1. Of course, it is also conceivable to read the car identification FIDn in several places.

The cableway control center 10 may, for example, detect the car identification FIDn of each car 5n when loading the cableway 1 with cars 5n before the start of operation. For this purpose, for example, the car identification FIDn of cars 5m can be read in the area of the switches connecting the car storage and the main line of the cableway 1 while they are loaded, for example by arranging a transmitting antenna 31 in this area. The reader 30 connected to the transmitting antenna 31 then transmits the respective car identification FIDn to the cableway control system 10. Thus, the cableway control system 10 also knows the order of the cars 5n on the conveying cable 4.

This makes it possible for the cableway control system 10 to associate a function status message FSi obtained from a function monitoring unit 20i, or the malfunctions and/or car parameters contained therein, with a specific car 5n which has triggered the function status message FSi. The cableway control system 10 now stores any function status message FSi received, or the malfunctions and/or car parameters contained therein, with the car identification FIDn. This makes it possible to examine the stored function status messages FSi or the malfunctions and/or car parameters contained therein, for example, with respect to a trend or an increased accumulation, to draw conclusions about a failure cause, which can significantly simplify the troubleshooting, as explained below in detail.

In this case, it is equally advantageous if not only a malfunction can be transmitted in a function status message FSi but also a car parameter ascertained by a function monitoring unit 20i, because this can assist with the troubleshooting. A function status message FSi may also include both, of course, a malfunction and a car parameter.

Depending on which function is monitored, a function monitoring unit 20i may be arranged at different places along the cableway 1. Typical function monitoring units 20i will be described below with reference to FIG. 4 by way of example and not limiting.

A function monitoring unit 201 may, for example, check the spring force of the clamping spring of the clamp 16 of a car 5n at station 2 each time the cars 5n pass through the station. For this purpose, the function monitoring unit 201 is preferably arranged at a location where the clamp 16 is decoupled from the conveying cable 4. The clamp lever 13 may be actuated in the function monitoring unit 201 against the action of the clamping spring and thus the force that is applied, which is a measure of the spring force, may be measured. The measured spring force is transmitted in a function status message FS1 of the function monitoring unit 201 to the cableway control system 10 as a car parameter. Upon detection of a malfunction, for example when the spring force falls below a required, predetermined limit, the function monitoring unit 201 could transmit a function status message FS1 about the malfunction to the cableway control system 10, possibly together with the car parameter. A corresponding action is then triggered in the cableway control system 10. In the event of a malfunction, the cableway 1 could be shut down, or the operating personnel might initiate the removal of the car 5n causing the malfunction.

A car identification FIDn may also be read in the area of the function monitoring unit 201 although it can be assumed that the cableway control system 10 knows which car 5n is currently in the area of the function monitoring unit 201. If the car identification FIDn is read again, possible faults may be detected in the cableway control system 10. For example, the position of a car 5n on the conveying cable 4 could change due to an operating error, or a car 5n could also be lost in the worst case.

The function status messages FS1, or the car parameters contained therein, are stored in the cableway control system

10 together with the car identification FIDn, for example in a suitable database. This makes it possible to detect a trend toward the deterioration of the spring force.

For this purpose, the data sets that belong to a function status message FSi of the function monitoring unit $20i$ may be filtered out for a specific car $5n$ in the cableway control system 10, for example by means of suitable software tools used for evaluation purposes, which is easily possible via the stored car identification find, and the change of the stored car parameters over time be evaluated. The measured spring force could be output or displayed or otherwise evaluated, for example. Based on this trend evaluation, it is also possible to determine if a clamping spring is broken (there are usually several clamping springs), because this leads to a step of the spring force.

The stored malfunctions can also be analyzed by means of suitable software tools. The frequency of a malfunction of a particular function monitoring unit $20i$ triggered by the same car $5n$ could be evaluated, for example. When it is always the same car $5n$ that triggers a malfunction, this may be a clear indication for a malfunction of the car $5n$. The frequency of malfunctions of a particular function monitoring unit $20i$ triggered by different cars $5n$ could be evaluated in the cableway control system 10 as well. If a certain malfunction is triggered by different cars $5n$, this may be an indication of a defect in the area of the function monitoring unit $20i$ or in the cableway component monitored by the function monitoring unit $20i$.

In particular, but not only, in the case of detachably coupled cars $5n$, the station pass is logically often divided into so-called passage zones DZm, m≥1, for example a passage zone DZ1 in which the car $5n$ is decoupled from the conveying cable 4 and decelerated, a passage zone DZ2 in which people get on or off and a passage zone DZ3 in which the car $5n$ is accelerated and coupled to the conveying cable 4. Of course, more or fewer passage zones DZm are conceivable as well. Basically, there is always only one car $5n$ in a passage zone DZm, which can be easily ensured by a corresponding division of the passage zones DZm. This is described using the example of a passage zone DZ1 but generally applies to any passage zone DZm.

A function monitoring unit 202 is now configured as a passage safeguard for the passage zone DZ1. This is to ensure that a car $5n$ is moved through the passage zone DZ1 within a defined time window. Instead of time, of course, the traveled cable distance could be used as well since time and cable distance traveled are equivalent. For purposes of passage safeguard, it is therefore also possible to determine whether the cable distance traveled by a car $5n$ is too long or too short. For this purpose, the cable distance traveled in station 2 may also be measured directly. The distance measurement has the advantage that it is independent of the speed of the cable (and therefore of the time). If the car $5n$ is too slow or too fast, the specified permissible cable distance range is violated, and a fault must be assumed. Such a malfunction is transmitted to the cableway control system 10 in a function status message FS2. In this case, the cableway control system 10 shuts the cableway 1 down. In addition, the transit time or the cable distance for the passage for each car $5n$ passing through the passage zone DZ1 could be transmitted to the cableway control system 10 in a function status message FS2 as car parameter. Each function status message FS2 is stored in the cableway control system 10 together with the assigned car identification FIDn.

This again enables an evaluation of the stored function status messages FS2 or the malfunctions and car parameters transmitted therein. For this purpose, the trend of the transit time for a particular car $5n$ can again be examined and evaluated with suitable software tools. If there is a trend that a car $5n$ is being moved faster and faster through the passage zone DZ1, this may be due to a worn or icy friction lining 19. If a car $5n$ tends to be moved slower and slower through the passage zone DZ1, this can be an indication of a mechanical defect. If, on the other hand, it is determined that different cars $5n$ report a malfunction in the same passage zone DZ1, this may be an indication of a problem with the conveyors, for example the conveyor wheels 7, for example too low tire pressure, in the passage zone DZ1, or a problem with the drive of the conveyors in the passage zone DZ1, for example the tension of a V-belt is too low. By evaluating the stored function status messages FS2, troubleshooting can thus be considerably simplified and accelerated.

The passage time through the passage zone DZ1 can be detected, for example, by detecting the entrance of a car $5n$ into the passage zone DZ1 via a first sensor 21 at the beginning of the passage zone DZ1 and by measuring the time in the function monitoring unit 202 until the car $5n$ leaves the passage zone DZ1 again, which can be determined via a second sensor 22 at the end of the passage zone DZ1. The time can also be detected by a counter, which starts when the car $5n$ enters the passage zone DZ1 and stops when the car $5n$ leaves the passage zone DZ1. The cable distance traveled in the passage zone DZ1 can be detected in basically the same way.

The first sensor 21 and/or the second sensor 22 could also be implemented by reading a car identification FIDn, for example as a reader 30 for a radio transponder. The reading of a car identification FIDn can be used as the time the car enters or exits the passage zone DZ1.

When using a radio transponder RFn for storing the car identification FIDn, the transmitting antenna 31 (or several transmitting antennas 31 together) could cover the entire length of the passage zone DZ1 in the direction of movement of the car $5n$. Due to the known normal speed of the car $5n$ in the passage zone DZm and the characteristics of the installed radio transponder RFn, it is known how many times the radio transponder RFn on the car $5n$ can be read in the passage zone DZ1. For example, 6-8 readings are possible in a typical implementation with a length of the transmitting antenna 31 of 7 m and a car speed of 7 m/s. If less than 6 readings or more than 8 readings take place in the passage zone DZ1, it can be assumed that the car $5n$ has traveled either too slowly or too quickly through the passage zones DZ1. Even that could be used as a sufficiently accurate counter for the travel through the passage zone.

However, a passage zone DZm need not necessarily be in station 2. A passage zone DZm with a function monitoring unit $20i$ could also be provided along the route between two stations. A sheave assembly on a lift pylon of the cableway 1, for example, could be defined as passage zone DZm to ensure that no cars $5n$ get stuck along the sheave assembly.

Another example of a function monitoring unit 203 is the monitoring of a door or restraining bar lock of a car $5n$. To protect the passengers, cars $5n$ are not only closed after boarding (e.g. with a door in a gondola or a restraining bar on a chair) but also the door and the restraining bar are mechanically locked to prevent any unintentional or improper opening of the car $5n$ along the route. The function monitoring unit 203 is intended to prevent exit of the car $5n$ or the start-up of the car $5n$ at all in the event of a faulty locking mechanism. For this purpose, a well-known lock monitoring unit is arranged in the station 2 in the area in which the door or restraining bar is closed and locked, which detects the status of the lock and transmits said status to the function monitoring unit 203. If not properly locked, the function monitoring unit 203 transmits a function status message FS3 about a malfunction to the cableway control system 10. The cableway control system 10 then stops cableway 1 or triggers another desired action. The status of the lock could also be transmitted to the function monitoring unit 203 together with the car identification FIDn stored in the car 5n, which can thus also pass on the car identification FIDn to the cableway control system 10. The function status message FS3 is again stored together with the car identification FIDn of the triggering car 5n in the cableway control system 10. By evaluating the stored function status messages FS3 or the malfunctions transmitted in this manner, it is possible to determine by means of suitable software tools whether such malfunctions occur more frequently in a particular car 5n, which may be an indication of a defect of the lock on the car 5n.

Another example of a function monitoring unit 204 is the monitoring of a seat heating of a car 5n, here for example a chair. During the passage of the car 5n through the station 2, the heating phase of the seat heating takes place in that the seat heating of the car 5n is supplied with power via busbars in the station 2. In this case, the function monitoring unit 204 can detect the power consumption of the car 5n during the heating phase. The detected power consumption can be transmitted to the cableway control system 10 in a function status message FS4 as a car parameter. If the function monitoring unit 204 determines that the power consumption is too low or too high compared to predetermined limits, a function status message FS4 reporting a malfunction may be transmitted to the cableway control system 10 as well. The function status message FS4 with the car identification FIDn of the triggering car 5n is once again stored in the cableway control system 10. By evaluating the stored function status messages FS4 by means of suitable software tools, it can be determined whether there is an increased frequency of such malfunctions in a particular car 5n, which may be an indication of a seat heater malfunction on the car 5n. Likewise, the trend of the power consumption of a car 5n over time could again be evaluated in order to determine a deterioration. If different cars 5n report malfunctions or if different cars 5n show a similar deterioration trend, this could also be an indication of a defect in the station 2.

A further example of a function monitoring unit 205 is a so-called barrier 23 (FIG. 2), which is arranged in the area of a specific component of the car 5n and shaped in such a way that the component in its normally expected orientation, location and position moves past the barrier without touching the barrier. In the event of an unexpected orientation, location or position of the component, however, the component comes in contact with the barrier, which is triggered by the movement of the car 5n, for example in that the barrier 23 is rotated or displaced, which can be detected by any sensor 24 and be transmitted, for example, to the function monitoring unit 205. The triggering of a barrier 23 is usually a malfunction that is transmitted by the function monitoring unit 205 to the cableway control system 10 in a function status message FS5. There, the function status message FS5 is again assigned to the triggering car 5n, and the function status message FS5 is stored together with the car identification FIDn in the cableway control system 10. By evaluating the stored function status messages FS5 by means of suitable software tools, it can be determined whether there is an increased frequency of such malfunctions in a particular car 5n, which may be an indication of a fault on the car 5n, for example an icy or broken component.

A function monitoring unit 20i may be configured in the form of suitable hardware, for example a computer or a PLC, and/or in the form of software.

Although not absolutely necessary, the car identification FIDn of a car 5n may be read in each function monitoring unit 20i in the area of the function monitoring unit 20i and likewise be transmitted to the cableway control system 10.

The manner in which the function status messages FSi or the malfunctions or car parameters are stored in the cableway control system 10 is arbitrary. Of course, using a database is suitable in which a data record per function status message FSi is stored with the car identification FIDn and malfunction (possibly in the form of a unique code) and/or with car parameter (preferably as a measured value). A data record can also be provided with a time stamp which marks the arrival of the function status messages FSi.

The invention claimed is:

1. A method of operating a cableway, wherein the cableway is controlled by a cableway control system to move a plurality of cars between a first station and a second station, comprising:
   providing a function monitoring unit to monitor a function of the cableway, wherein each car is assigned a unique car identification and the car identification of each car is known in the cableway control system;
   detecting, with the function monitoring unit, malfunctions triggered by cars during the operation of the cableway, the malfunctions representing a deviation of the function of the cableway from an expected normal function;
   transmitting, with the function monitoring unit, the detected malfunctions triggered by cars during the operation of the cableway to the cableway control system in a function status message;
   assigning, with the cableway control system, a malfunction that was received to a triggering car;
   storing the malfunction together with the car identification of the triggering car in the cableway control system;
   evaluating, with the cableway control system, a frequency of malfunctions triggered by the same car or by different cars.

2. The method according to claim 1, wherein the function monitoring unit detects car parameters of the cars and the car parameters of the cars are transmitted to the cableway control system with a function status message where the car parameters are assigned to the triggering car and are stored and evaluated together with the car identification of the triggering car.

3. The method according to claim 2, wherein in the cableway control system a trend of a car parameter of a particular car received from a particular function monitoring unit over time is evaluated.

4. The method according to claim 2, wherein car parameters of a particular function control unit and of different cars are evaluated in the cableway control system.

5. The method according to claim 1, wherein an action on the cableway is triggered by the cableway control system in response to a malfunction received.

6. The method according to claim 1, wherein car identifications of the cars are detected during the loading of the cableway with the cars, and the detected car identifications are transmitted to the cableway control system.

7. The method according to claim 1, wherein the function monitoring unit detects a car identification of a car and transmits it to the cableway control system.

8. The method according to claim 7, wherein the car identification is transmitted together with a malfunction and/or car parameter in the function status message.

9. The method according to claim 1, wherein the function monitoring unit detects a spring force of a clamp of a car, and the detected spring force is transmitted in the function status message to the cableway control system as a car parameter.

10. The method according to claim 9, wherein the function monitoring unit transmits a function status message about a malfunction to the cableway control system when the detected spring force falls below a predetermined limit.

11. The method according to claim 1, wherein a passage of a car is monitored with the function monitoring unit in a defined passage zone in the station or between the two stations, and a time of passage or a traveled cable distance for the passage through the passage zone is detected and transmitted as a car parameter in the function status message to the cableway control system.

12. The method according to claim 11, wherein the function monitoring unit transmits a function status message about a malfunction to the cableway control system when the car is moved too slowly or too fast through the passage zone with respect to a predetermined time window or a predetermined cable distance range.

13. The method according to claim 1, wherein a door or restraining bar lock of a car is monitored with the function monitoring unit, and a function status message with a malfunction is transmitted to the cableway control system when a faulty door or restraining bar lock is detected.

14. The method according to claim 1, wherein the function monitoring unit monitors a seat heater of a seat of a car, and power consumption of the seat heater is transmitted in the function status message to the cableway control system as a car parameter.

15. The method according to claim 14, wherein the function monitoring unit transmits a malfunction in the function status message to the cableway control system when the detected power consumption falls below or exceeds a predetermined limit.

16. The method according to claim 1, wherein the function monitoring unit monitors a barrier, and a malfunction in the function status message is transmitted to the cableway control system when a car triggers the barrier.

17. A cableway, comprising:
a cableway control system adapted to move a plurality of cars between a first station and a second station;
a function monitoring unit adapted to monitor a function of the cableway, wherein each car is assigned a unique car identification and the car identification of each car is known in the cableway control system;
the function monitoring unit is adapted to detect malfunctions triggered by cars during the operation of the cableway;
the function monitoring unit is adapted to transmit the detected malfunctions triggered by cars during the operation of the cableway to the cableway control system in a function status message;
the cableway control system is adapted to assign a malfunction that was received to a triggering car;
the cableway control system is adapted to store the malfunction together with the car identification of the triggering car;
the cableway control system is adapted to evaluate a frequency of malfunctions triggered by the same car or by different cars.

18. The cableway of claim 17, wherein the function monitoring unit monitors a seat heater of a seat of a car, and power consumption of the seat heater is transmitted in the function status message to the cableway control system.

19. The cableway of claim 18, wherein the function monitoring unit transmits a malfunction in the function status message to the cableway control system when the detected power consumption falls below or exceeds a predetermined limit.

* * * * *